United States Patent [19]
Boileau

[11] 3,782,441
[45] Jan. 1, 1974

[54] TIRE HAVING CARCASS CORDS DESCRIBING S-SHAPED AND Z-SHAPED PATHS

[75] Inventor: Jacques Boileau, Clermont-Ferrand, France

[73] Assignee: Compagnie Generale Des Establissements Michelin, raison sociale Michelin & Cie, Clermont-Ferrand (Puy-de-Dome), France

[22] Filed: Oct. 15, 1971

[21] Appl. No.: 189,657

[30] Foreign Application Priority Data
Oct. 19, 1970 France .............................. 7037730
July 30, 1971 France .............................. 7128183

[52] U.S. Cl. .................................. 152/356, 152/359
[51] Int. Cl. ............................................. B60c 9/10
[58] Field of Search ................... 152/354, 356, 357, 152/359

[56] References Cited
UNITED STATES PATENTS
3,605,849 9/1971 Boileau .............................. 152/356
3,581,793 6/1971 Wittneben .......................... 152/354

FOREIGN PATENTS OR APPLICATIONS
992,341 5/1965 Great Britain ..................... 152/354

Primary Examiner—Drayton E. Hoffman
Attorney—Granville M. Brumbaugh et al.

[57] ABSTRACT

The carcass reinforcement of a pneumatic tire extends continuously from one bead wire to the other. The cords of the reinforcement have a substantially longitudinal orientation under the tread portion, an oblique orientation between the midpoint of each sidewall and the corresponding bead wire, and, between the midpoint of each sidewall and the corresponding shoulder, an S-shaped path tangent at two circumferentially and radially separated points to radial planes of the tire.

10 Claims, 8 Drawing Figures

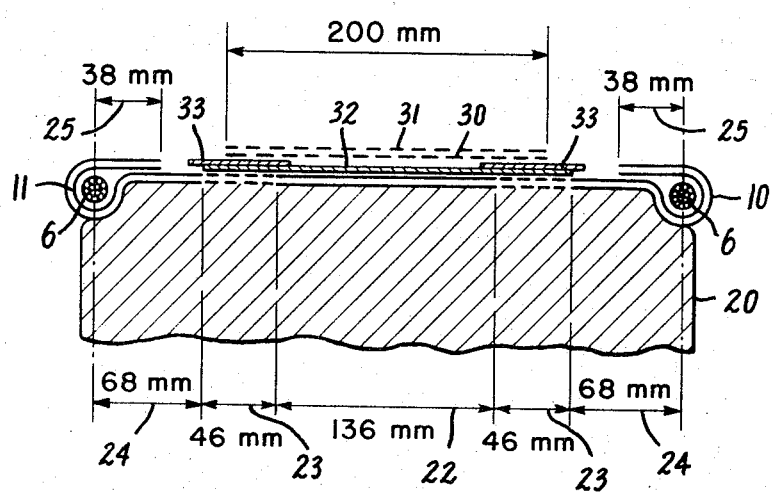
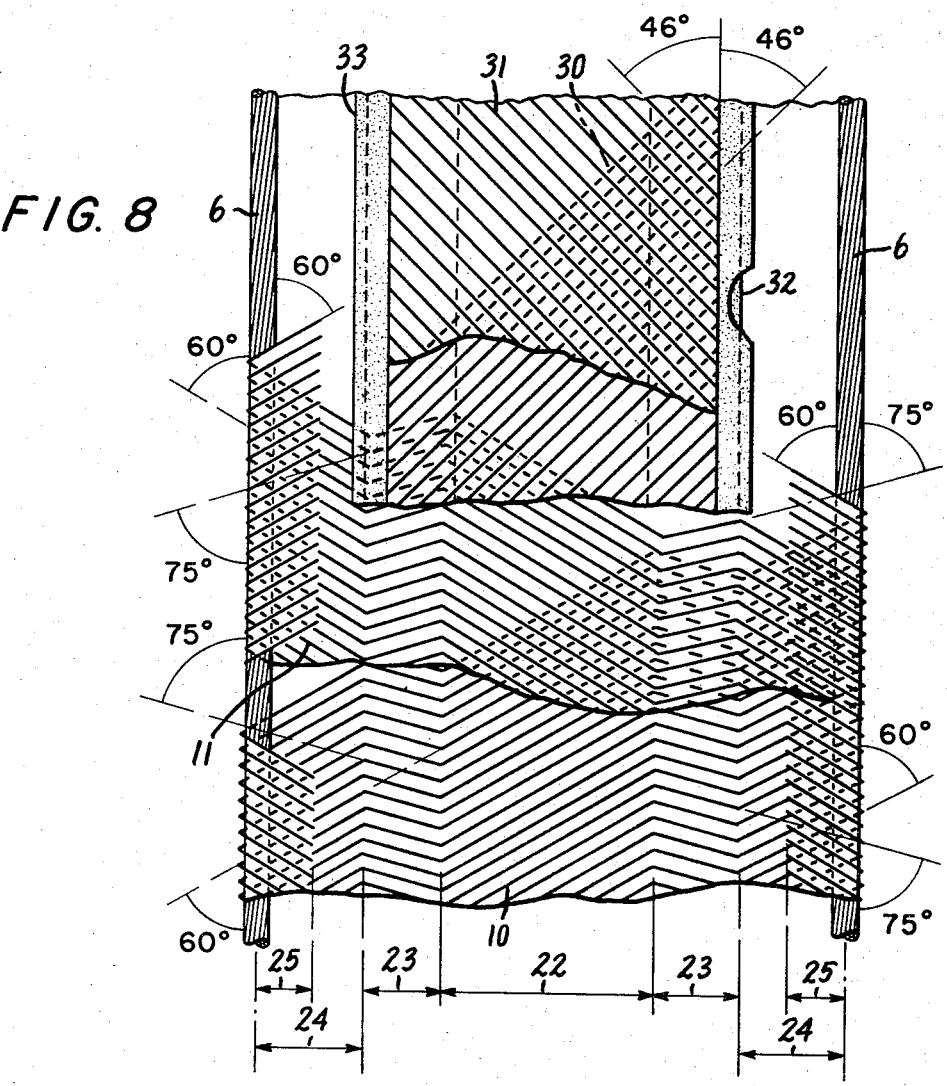

TIRE HAVING CARCASS CORDS DESCRIBING S-SHAPED AND Z-SHAPED PATHS

BACKGROUND OF THE INVENTION

This invention relates to pneumatic tires for automotive vehicles and, more particularly, to novel and highly-effective pneumatic tires having an improved reinforcement and to a method of making the tires.

Two main types of tires which differ in the structure of their reinforcement are at present being produced: the bias tire and the radial tire.

In the bias tire the carcass is composed of cords arranged diagonally in two symmetrical directions. It is possibly supplemented by a tread reinforcement consisting of oblique cords parallel or approximately parallel to those of the carcass.

In the radial tire the carcass is composed of cords arranged in radial planes and it is reinforced by a tread reinforcement which makes the tread undeformable parallel to its surface and comprises cords arranged along directions which do not substantially differ from the longitudinal direction.

With regard to manufacture, tires with a bias carcass are much easier and cheaper to manufacture than tires with a radial carcass. The main reason is that they require the assembling of a smaller number of parts and call for less precision in assembling.

With regard to the properties, on the other hand, the balance is definitely in favor of the radial tire, which provides in particular much greater safety and longer life. Despite its higher cost, the radial tire is, in the long run, much more economical. However, the bias tire has certain advantages—in addition to ease of manufacture, mention may be made of the strength of the sidewalls and better absorption of shocks.

Of course, many attempts have been made to effect a combination of the advantages of the two types of tires. Most have led only to compromises which result in a loss of both the great simplicity of manufacture of the bias tire and the excellent properties of the radial tire. One well-known attempt is that which relates to the so-called "bias-belted" structure, that is to say a belted bias tire; this is more expensive to produce than the conventional bias tire and moreover is far inferior to the radial tire in its qualities. Of the attempts directed at a truly original structure, the most interesting is the one described in my copending divisional U.S. Pat. application Ser. No. 124,831, filed Mar. 3, 1971, and its parent application Ser. No. 795,759, filed Nov. 13, 1968, and issued on Sept. 20, 1971, as U.S. Pat. No. 3,605,849. This structure comprises the use of cores which are continuous from steel bead wire to steel bead wire but have different orientations in different regions of the tire: namely, approximately longitudinal under the tread, radial in a region between the shoulder and the midpoint of the sidewall, and oblique between the midpoint of the sidewall and the bead. Because of the use of special cord plies in which the cords are biased over the major part of the width of the ply and are perpendicular to the edges over short regions, such a tire is also manufactured more easily than a bias tire. This tire furthermore has properties which make it much more similar to the radial tire than to the bias tire, although its structure is closer to that of the bias tire.

SUMMARY OF THE INVENTION

An object of the invention is to remedy the problems of prior-art tires noted above and to improve the structure disclosed in application Ser. No. 124,831 mentioned above. In particular, an object of the invention is to provide a tire which, unlike conventional tires, affords the possibility of angular displacement of the tread with respect to the sidewalls, which improves the behavior of the tire. Another object is to permit easy and economical manufacture from plies produced with acceptable tolerances.

The foregoing and other objects are attained in accordance with the invention by the provision of a tire comprising a reinforcement made of cords which are continuous from steel bead wire to steel bead wire and which have different orientations in different regions of the tire and in particular an approximately longitudinal orientation under the tread and an oblique orientation between the midpoint of each wall and the corresponding steel bead wire. The tire is characterized in that the cords, between the midpoint of each wall and the corresponding shoulder, have an S-shaped or Z-shaped path which is tangent at two points to the radial planes of the tire.

Preferably, the distance in the radial direction between the points of tangency of one and the same cord with the radial planes is between one-sixth and one-third of the height of the sidewall. It is ideally close to one-quarter of such height and extends approximately over half the distance between the center point of the sidewall and the shoulder.

In one embodiment, the cords of the same ply are contiguous under the tread. In another embodiment, the cords rise again up to the height of the middle of the sidewalls after having passed around the steel bead wires.

In another embodiment of the invention, the reinforcement, as defined above, is supplemented by a tread reinforcement extending substantially under the entire width of the tread and comprising at least two plies of cords slightly inclined to the longitudinal direction and being crosswise from ply to ply.

The tire is preferably characterized by the following additional features:

a. The angle made by the cords of the tread reinforcement with the longitudinal direction of the tire is smaller than that made by the cords which continue from steel bead wire to steel bead wire and form the carcass reinforcement;

b. between the tread reinforcement and the carcass reinforcement, a layer of soft rubber is interposed; and c. the change in direction of the cords of the carcass reinforcement commences at a point below the tread reinforcement so that the portion of the cords having an S-shaped path partially overlaps the tread reinforcement.

The presence of the tread reinforcement reduces the relatively large shearing forces between the plies of the carcass reinforcement in the region of the shoulders of the wire.

The method of manufacturing tires in accordance with the invention which do not have a tread reinforcement comprises the steps of assembling on a tire-making drum superimposed plies of cords which are continuous from steel bead wire to steel bead wire and arranged along several directions, placing a tread on the carcass which has thus been formed, and shaping the unit thus prepared and vulcanizing it in a mold. The method is characterized in that the plies comprise cords arranged diagonally along a first direction in the major part of their length and along the opposite direction in two intermediate zones.

Preferably, the angle of the cords in the intermediate zones of the plies is symmetrical (of equal magnitude and opposite signs as referred to the longitudinal direction of the tire) with the angle of the cords in the other zones and in any case does not differ by more than 15° from the symmetrical angle. The angles of the different portions of one and the same cord with the edge of the ply are between 40° and 55°. Their center-to-center spacing $e$ is close to:

$$e = d/t \ \sqrt{1 - \cos^2 \alpha_0 / 1 - (t^2 \cos^2 \alpha_0)}$$

in which $d$ is the diameter of the cords, $\alpha_0$ their angle of lay with respect to the longitudinal direction of the tire and $t$ the conformation ratio, that is to say the ratio of the diameter of the tread to that of the steel bead wires of the tire. For a value of $\alpha_0$ close to 50° and a value of $t$ close to 1.5, the spacing is close to $2d$.

The presence in the tire of the invention of a zone between each shoulder and the midpoint of the sidewall which is reinforced with cords which are not radial but form greatly elongated intersecting S's has the remarkable property of imparting to the tread a certain freedom to rotate with respect to the sidewalls. This reduced circumferential rigidity results in increased comfort and, surprisingly, increased safety—the sidewalls pull less on the tread, which thus remains flatter on the ground.

With regard to manufacture, experience shows that the process of the invention easily and without drawback tolerates irregularities in manufacture of the plies—the portion of the reinforcement in which the cords are only slightly inclined to the radial planes is put in place more easily and with more uniformity when such portion has been obtained by a change in direction of the cords than when the cords are initially placed radially. Manufacturing irregularities frequently result in an S-shaped path which is slightly variable, depending upon the cords. The important factor is that all the cords have an S-shape; the precise shape of the S is of less importance.

The tire in accordance with the invention which has both a carcass reinforcement and a tread reinforcement can be made in two sets of steps, the first comprising the manufacture and shaping of the carcass, and the second comprising the placing on of the tread reinforcement and of the tread. However—and this also constitutes a characteristic of the invention—, one can perform the steps in a different order by, for example, superimposing the carcass, the tread reinforcement and the tread on a tire-making drum and then proceeding with the shaping and the vulcanizing. The tread reinforcement then permits good centering of the tire in the vulcanization press, by physically representing the center plane of the tire and avoiding asymmetry with respect to the center plane. It is, however, desirable to place a layer of soft rubber between the carcass reinforcement and the tread reinforcement in order to make the tire conformable. Furthermore, the angle between carcass cords and tread reinforcement cords should not exceed 20° and preferably 15°.

BRIEF DESCRIPTION OF THE DRAWING

An understanding of other aspects of the invention can be gained from a consideration of the following detailed description of the preferred embodiments thereof, in conjunction with the appended figures of the drawing, wherein:

FIGS. 7 and 8 are radial and developed plan views, respectively, on a small scale, of the reinforcement plies of the tire of FIG. 5 as arranged on a tire-making drum.

DESCRIPTION OF THE PREFERRED EMBODIMENTS

Figure 1:
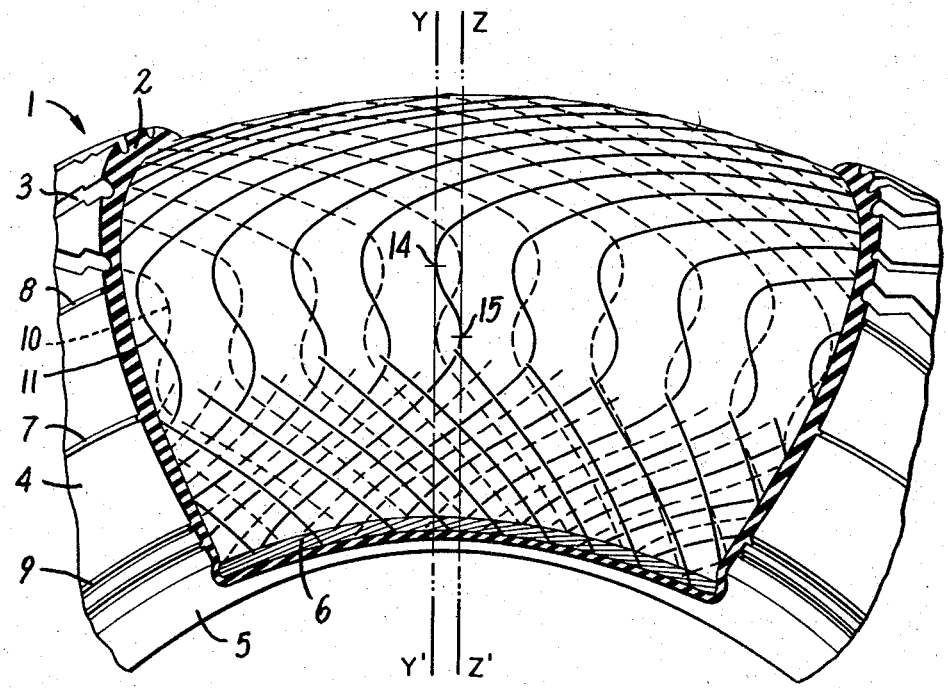
FIG. 1 is a side elevational perspective view of a portion of a tire in accordance with the invention, the rubber of the sidewalls and of the tread being partly broken away.
Figure 2:
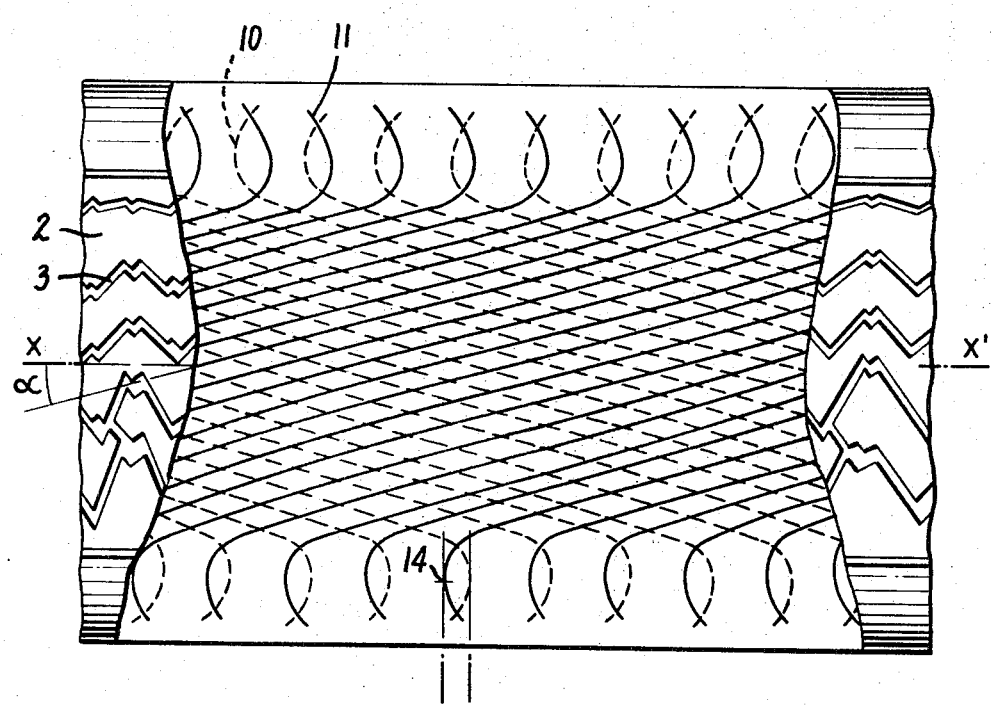
FIG. 2 is a top plan view of the same section of tire.

FIGS. 1 and 2 show a tire 1 having a tread 2 provided with grooves 3 and extended by two sidewalls 4 which are terminated by beads 5 containing steel bead wires 6. The middle of the sidewall 4, corresponding to the region of maximum width, is marked by a circular band 7. The shoulder, that is to say the zone of maximum meridian curvature, is also marked by a circular band 8. Another circular band 9 indicates the junction of the sidewall and the bead.

The reinforcement of the tire is composed solely of two plies 10 and 11, one shown in solid lines (ply 11) and the other in dashed lines (ply 10). For clarity in the drawing, only one cord out of about eight has been shown. The cords of these plies extend continuously from one steel bead wire 6 to the other. They move around each steel bead wire 6 and their ends are located substantially at the level of the band 7, that is to say, at the midpoint of the sidewall 4.

The cords of the plies 10 and 11 have special orientations in three regions. First of all, as shown in FIG. 2, below the tread 2, they are slightly inclined to the longitudinal direction X—X'; the angle $\alpha$ in this region is 15.5°. Between the midpoint of the sidewall 4 and the steel bead wire 6, the cords of the plies 10 and 11 and of their return portions form angles of the order of 45° to 50° with the steel bead wire 6 or with the parallel circles of the tire. Between the sidewall midpoint 7 and the shoulder 8, the cords of the plies 10 and 11 have respectively, in accordance with the invention, a very characteristic S-shaped or Z-shaped path which is tangent at two points, such as 14 and 15, to the radial planes Y—Y' and Z—Z'.

In accordance with the invention, the angular distance between the radial planes Y—Y' and Z—Z' is within the range of one to five times the angular distance between corresponding points of adjacent cords. In the case of the structure of FIGS. 1 and 2, the angular distance between the radial planes Y—Y' and Z—Z' is approximately twice the angular distance between corresponding points of two successive cords of the same ply.

The distance in radial direction between the points 14 and 15 is approximately equal to one-half the radial distance between the sidewall midpoint 7 and the shoulder 8.

Figure 3:
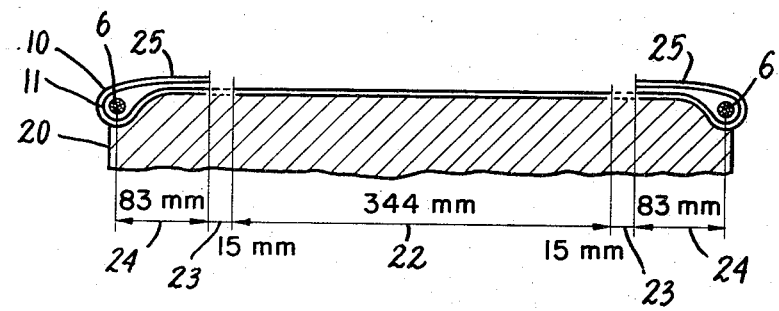
FIGS. 3 and 4 are views on a smaller scale, in section and in developed plan, respectively, of the reinforcement plies of the tire of FIGS. 1 and 2 when arranged on a tire-making drum.
Figure 4:
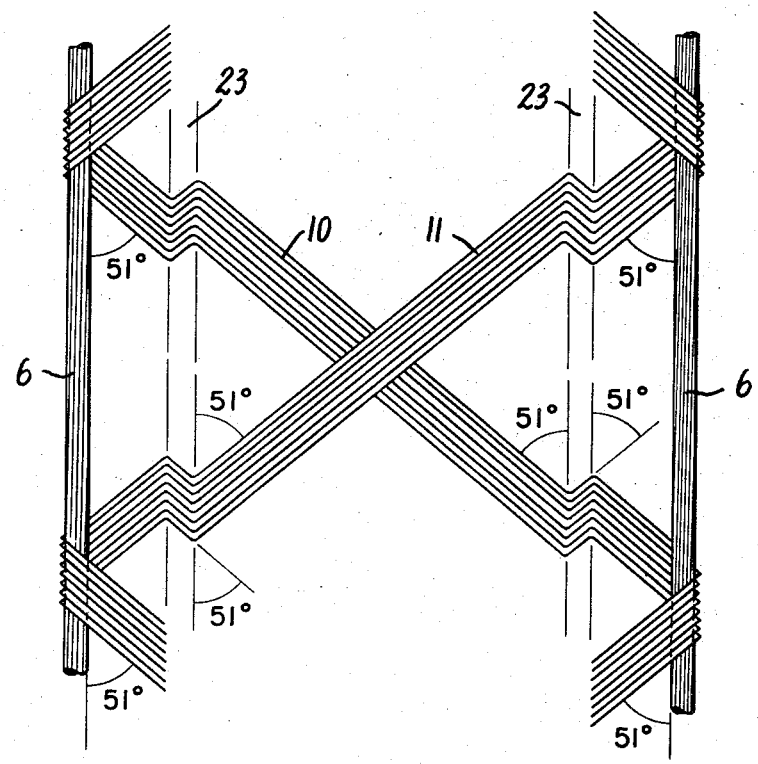

FIGS. 3 and 4 give characteristics of manufacture which have made it possible to obtain the tire of the invention shown in FIGS. 1 and 2 in size 165–15.

These figures show the two plies 10 and 11 arranged, together with the two steel bead wires 6, on a tire-making drum 20. Each ply has a central portion 22, two narrow intermediate zones 23 (shown in dotted line in FIG. 3), two lateral zones 24 and two return portions 25. The dimensions of these different zones are given in millimeters in FIG. 3. The angles made by the cords with the longitudinal direction are indicated in FIG. 4; in absolute value, these angles are all equal to 51°, this being true also in the intermediate zones 23 and in the return portions 25. In the case of each ply, however, the directions of the angles are opposite in zones 22 and 24 on the one hand and 23 and 25 on the other hand. The angle in the zones 23 can differ from 51° by 10° to 15° without this leading to any fundamentally different result. However, it is preferable that this angle be as close as possible to the angle in the other zones. On the carcass which has thus been produced, it is sufficient to place a tread and the covering of the sidewalls and then to give the unit a toric shape and vulcanize it in a mold in order to obtain the tire of FIGS. 1 and 2.

By way of illustration, the cords used are 1100/3 polyester threads. The distance between the threads is 1.8 mm and their diameter close to 0.7 mm, which has the result that the threads are practically contiguous under the tread. The thickness of the calendering is 0.27 mm on each side of the plies, the rubber used having a Shore hardness of 82 and a modulus of elasticity of 39 kg/cm$^2$ at 100 percent elongation. The curing mold used has in the example a diameter at the tread of 618 mm and an inner axial width of 166 mm at the height of the band 7.

Under these conditions, the following table gives the side thrust of the tire in accordance with the invention E compared with that of two commercial control tires T and T', both of radial type, one having a reinforcement entirely of textile and the other having a carcass of textile and a tread reinforcement of metal cables.

| Drift Angle | Side thrust in kg (wheel 4½ J 15 — Pressure 2.0 bars — Tire load 450 kg) | | |
| --- | --- | --- | --- |
| | E | T (textile) | T' (metal) |
| 2° | 122 | 118 | 146 |
| 15° | 422 | 388 | 400 |

Evidently, tire E is markedly superior to the all-textile radial tire. Moreover, its side thrust increases more rapidly with an increase in the angle of drift than does the side thrust of a radial tire having a metal tread reinforcement. Nevertheless, it is not a radial tire.

In order to obtain plies such as the plies 10 and 11 in which the diagonal cords are, in two intermediate zones, inclined at an angle symmetrical with respect to the angle of inclination of the portions of the cords immediately adjacent to the intermediate zones, one can use in part the process described in my copending Pat. application Ser. No. 795,759 now U.S. Pat. No. 3,605,849 referred to above. This process includes producing a relative displacement of the central portion 22 with respect to the lateral portions 24 and return portions 25 in order to modify the inclination of the cords in the intermediate portions 23. It is not necessary to obtain in these intermediate portions 23 an angle exactly symmetrical with respect to that of the portions 22 and 24; however, it is preferable to approach a symmetrical angle as closely as possible. The symmetrical angle is in fact the smallest angle with the longitudinal direction which is stable; with a smaller angle, the deformation is not stable, since, as a result of a reduction in the distance between cords, it leads to compression of the calendering rubber; with a larger angle, the advantages obtained by the invention are reduced.

Figure 5:
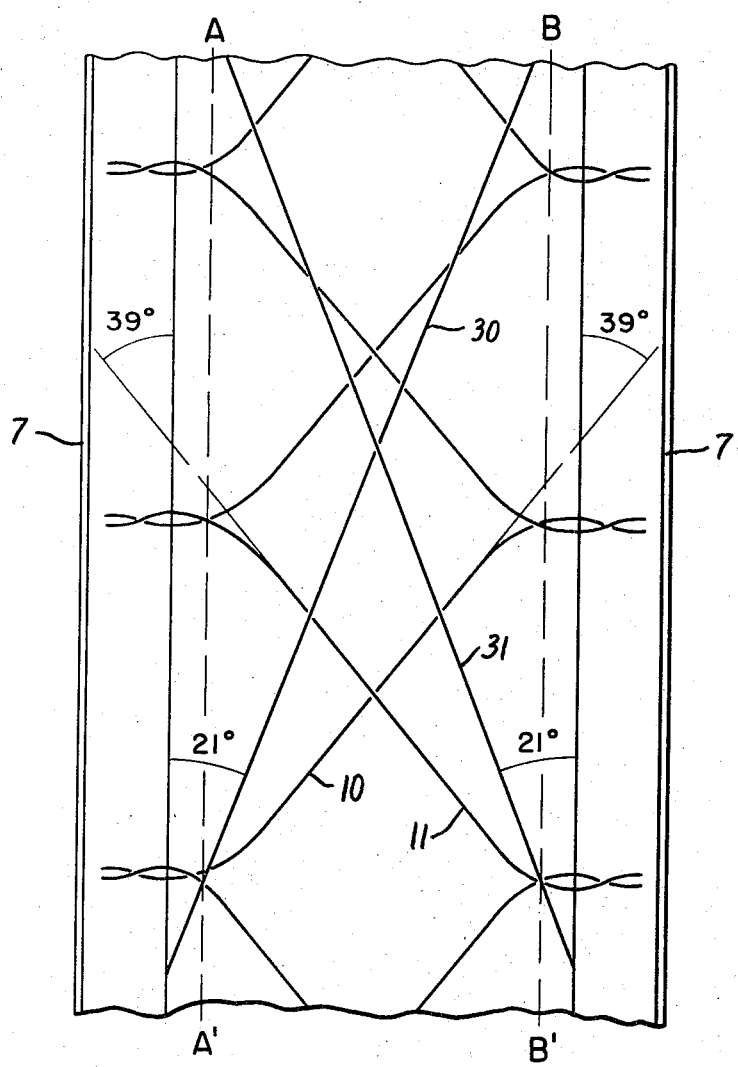
FIG. 5 is a top plan view of a portion of tire with tread reinforcement, the rubber being broken away.
Figure 6:
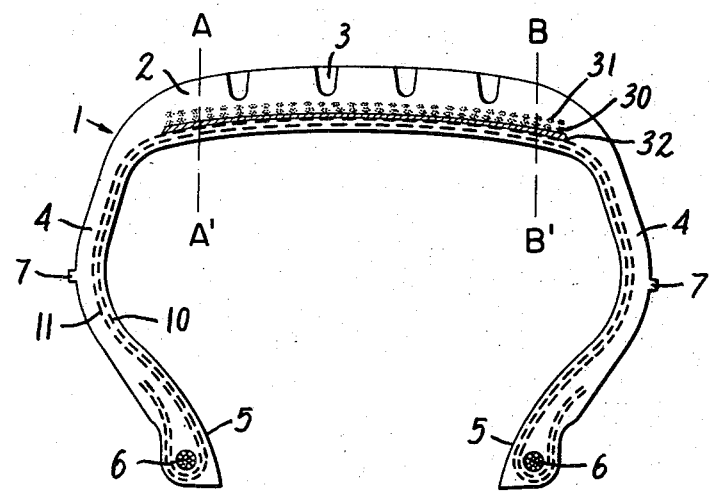
FIG. 6 is a radial section through the tire of FIG. 5.

FIGS. 5 and 6 show a tire 1 having a tread 2 provided with grooves 3 and extended by two sidewalls 4 terminating in beads 5 containing steel bead wires 6.

The reinforcement of the tire comprises two carcass plies 10 and 11 and two tread plies 30 and 31.

The cords of the carcass plies 10 and 11 are inclined with respect to the longitudinal direction by an angle of 39° between the lines A—A' and B—B' located some distance from the edges of the tread plies 30 and 31. Between the line A—A' or B—B' and the midpoint of the sidewall which is physically indicated by the band 7, the cords of the plies 10 and 11 have an S-shaped course. Between the sidewall midpoints 7 and the steel bead wires 6, the cords of the plies 10 and 11 or their return portions around the steel bead wires form an angle of about 45° to 50°.

The cords of the tread plies 30 and 31 are inclined with respect to the longitudinal direction by an angle of 21°.

The carcass plies 10 and 11 and the tread plies 30 and 31 are separated from each other by a layer of relatively soft rubber 32.

FIGS. 7 and 8 show the construction characteristics which make it possible to obtain the tire of FIGS. 5 and 6 in size 165–380.

These figures show the two carcass plies 10 and 11 and the two tread plies 30 and 31 arranged together with the two steel bead wires 6, on the tire-making drum 20.

Each carcass ply 10 or 11 comprises a central portion 22, two intermediate portions 23 shown in dashed lines in FIG. 7, two lateral zones 24 and two return portions 25. The dimensions of these different zones are given in millimeters in FIG. 7. The angles of the cords of the plies 10 and 11 are given in FIG. 8; the inclination of these cords to the longitudinal direction is 60° in portions 22, 24 and 25 and 75° in portions 23.

Each tread ply 30 or 31 is composed of cords inclined by an angle of 46°, as shown in FIG. 8. The width of these plies is given in millimeters in FIG. 7.

Between the plies 10 and 11 on the one hand and the plies 30 and 31 on the other hand there is arranged a layer of soft rubber 32 of a width greater than that of the plies 30 and 31. Furthermore, covering the intermediate portions 23 there are arranged two bands of soft rubber 33.

By way of illustration, the cords used for the plies 10 and 11 are of 1100/3 polyester yarns. The distance between the cords is 1.4 mm. The thickness of the calendering is 0.4 mm on each side, the calendering rubber having a modulus of 115 kg/cm$^2$ at 100 percent elongation. The cords used for the plies 30 and 31 are steel cables comprising four wires of 0.23 mm diameter. The distance between these cables is 1.6 mm. The thickness of the calendering is 0.4 mm, the calendering rubber having a modulus of 390 kg/cm$^2$ at 100 percent elongation. The rubber of the layers 32 and 33 has a modulus of 115 kg/cm² at 100 percent elongation. Their thicknesses are 0.6 and 0.8 mm respectively. Under these conditions, the drift thrust of the tire of FIGS. 5 to 8 is 126.5 kg with 2° drift and 454.5 kg with 15° drift, for an inflation pressure of 2.0 bars and a load on the tire of 450 kg, and with a wheel of type 4½ J 15. Moreover, the tire in accordance with the invention clearly differs from a bias-belted tire manufactured with the same components. In particular, under a load of 450 kg and an inflation pressure of 2 bars, it has a crushing deflection of more than 6 mm due to the fact that the cords of the carcass have an S-shaped path tangent to the radial planes of the tire in the vicinity of the shoulders. This results in a considerable increase in comfort.

The special plies of the invention described above are of course independent of the process used to obtain them.

Thus there are provided in accordance with the invention a novel and highly effective pneumatic tire having an improved reinforcement and a method of making the tire. Many modifications of the embodiments described herein will readily occur to those skilled in the art upon consideration of this disclosure. For example, it is within the scope of the invention to form, instead of an S-shaped path having a single cycle, an undulated path having more than one or a plurality of cycles. In particular, one may employ plies having zones formed of zigzag cords. Accordingly, the invention is to be construed as including all the embodiments thereof within the scope of the appended claims.

I claim:

1. A tire comprising a tread portion, a pair of sidewalls respectively extending radially inwardly from opposite edges of said tread portion and respectively joining said tread portion at a pair of shoulders, each sidewall having a bead at the radially inward edge thereof, each bead having therein a bead wire, and a carcass reinforcement, said reinforcement being formed of an even number of plies continuous from one of said bead wires to the other, each of said plies comprising parallel reinforcement cords which assume different orientations in different regions of the tire and which have an orientation below the tread only slightly inclined to the longitudinal direction, an oblique orientation between the midpoint of each sidewall and the corresponding bead wire, and, in a region between the midpoint of each sidewall and the corresponding shoulder, a reverse inclination opposite to the inclination of portions of the same ply that are radially outward and radially inward of said region, so that said plies are respectively S-shaped and Z-shaped, each cord of each ply is tangential at two different points to two different radial planes of the tire, and the cords of one ply intersect corresponding cords of the other at three points.

2. A tire according to claim 1 wherein said reinforcement cords are contiguous in said tread portion.

3. A tire according to claim 1 wherein said reinforcement cords extend around said bead wires and rise again in each sidewall substantially to the midpoint thereof.

4. A tire according to claim 1 further comprising a tread reinforcement substantially coextensive with said tread portion and comprising at least two plies of cords, the cords of said tread plies being slightly inclined with respect to the longitudinal direction of the tire and the cords of each of said tread plies being in crossed relation with respect to the cords of the other of said tread plies.

5. A tire according to claim 1 further comprising a tread reinforcement substantially coextensive with said tread portion and comprising at least two plies of cords, the cords of each of said tread plies being in crossed relation with respect to the cords of the other of said tread plies and the cords of both of said tread plies forming with the longitudinal direction of the tire angles smaller than those formed with the longitudinal direction of the tire by said reinforcement cords under said tread portion.

6. A tire according to claim 1 further comprising a tread reinforcement substantially coextensive with said tread portion and comprising at least two plies of cords, the cords of said plies being slightly inclined with respect to the longitudinal direction of the tire and the cords of each of said tread plies being in crossed relation with respect to the cords of the other of said tread plies, further comprising a layer of soft rubber separating said carcass reinforcement from said tread reinforcement.

7. A tire according to claim 1 further comprising a tread reinforcement substantially coextensive with said tread portion and comprising at least two plies of cords, the cords of said tread plies being slightly inclined with respect to the longitudinal direction of the tire and the cords of each of said tread plies being in crossed relation with respect to the cords of the other of said tread plies and wherein said reverse inclination is located partly below said tread reinforcement.

8. A tire comprising a tread portion, a pair of sidewalls respectively extending radially inwardly from opposite edges of said tread portion and respectively joining said tread portion at a pair of shoulders, each sidewall having a bead at the radially inward edge thereof, each bead having therein a bead wire, and a carcass reinforcement, said reinforcement comprising cords which are continuous from one of said bead wires to the other and which have a substantially longitudinal orientation under said tread portion, an oblique orientation between the midpoint of each sidewall and the corresponding bead wire, and, between the midpoint of each sidewall and the corresponding shoulder, an S-shaped path tangent at two points to radial planes of the tire, the angular distance between said points of tangency to a given cord being within the range of one to five times the angular distance between corresponding points of adjacent cords.

9. A tire comprising a tread portion, a pair of sidewalls respectively extending radially inwardly from opposite edges of said tread portion and respectively joining said tread portion at a pair of shoulders, each sidewall having a bead at the radially inward edge thereof, each bead having therein a bead wire, and a carcass reinforcement, said reinforcement comprising cords which are continuous from one of said bead wires to the other and which have a substantially longitudinal orientation under said tread portion, an oblique orientation between the midpoint of each sidewall and the corresponding bead wire, and, between the midpoint of each sidewall and the corresponding shoulder, an S-shaped path tangent at two points to radial planes of the tire, the radial distance between said points of tangency to a given cord being within the range of one-sixth to one-third of the radial height of one of said sidewalls.

10. A tire comprising a tread portion, a pair of sidewalls respectively extending radially inwardly from opposite edges of said tread portion and respectively joining said tread portion at a pair of shoulders, each sidewall having a bead at the radially inward edge thereof, each bead having therein a bead wire, and a carcass reinforcement, said reinforcement comprising cords which are continuous from one of said bead wires to the other and which have a substantially longitudinal orientation under said tread portion, a oblique orientation between the midpoint of each sidewall and the corresponding bead wire, and, between the midpoint of each sidewall and the corresponding shoulder, an S-shaped path tangent at two points to radial planes of the tire, the radial distance between said points of tangency to a given cord being substantially one-quarter of the radial height of one of said sidewalls.

* * * * *

PO-1050
(5/69)

UNITED STATES PATENT OFFICE
CERTIFICATE OF CORRECTION

Patent No. 3,782,441        Dated January 1, 1974

Inventor(s) Jacques Boileau

It is certified that error appears in the above-identified patent and that said Letters Patent are hereby corrected as shown below:

Col. 1, line 51, "cores" should read --cords--; Col. 3, line 62, "conformable" should read --blank easy to shape--; Col. 6, line 35, after "165-380" insert --(European size)--; Col. 7, lines 56 and 57, "reinforecement" should read --reinforcement--; and Col. 10, line 1, "a" should read --an--.

Signed and sealed this 24th day of September 1974.

(SEAL)
Attest:

McCOY M. GIBSON JR.        C. MARSHALL DANN
Attesting Officer            Commissioner of Patents